(12) United States Patent
Wang

(10) Patent No.: US 6,915,922 B2
(45) Date of Patent: Jul. 12, 2005

(54) PRESSURE TANK

(76) Inventor: Li-Ming Wang, No. 9-49, Shenlin Rd., Shengang Township, Taichung County 429 (TW)

( * ) Notice: Subject to any disclaimer, the term of this patent is extended or adjusted under 35 U.S.C. 154(b) by 0 days.

(21) Appl. No.: 10/642,724

(22) Filed: Aug. 19, 2003

(65) Prior Publication Data

US 2004/0031800 A1 Feb. 19, 2004

Related U.S. Application Data

(63) Continuation-in-part of application No. 10/057,962, filed on Jan. 29, 2002, now abandoned, which is a continuation-in-part of application No. 09/663,141, filed on Sep. 15, 2000, now abandoned.

(51) Int. Cl.[7] .............................. B65D 1/32; B65D 6/12
(52) U.S. Cl. ........................ 220/720; 138/30; 220/721; 220/723
(58) Field of Search ................................. 220/720, 721, 220/723, 601, 661, 4.12; 138/30

(56) References Cited

U.S. PATENT DOCUMENTS

| | | | |
|---|---|---|---|
| 2,522,258 A | * 9/1950 | Fanshier | 73/298 |
| 2,893,433 A | * 7/1959 | Macduff | 138/30 |
| 3,524,475 A | * 8/1970 | Kirk, Jr. | 138/30 |
| 4,215,187 A | * 7/1980 | Gnida et al. | 429/161 |
| 2005/0017016 A1 | * 1/2005 | Lombari | 220/721 |

* cited by examiner

*Primary Examiner*—Joseph C. Merek
(74) *Attorney, Agent, or Firm*—Rosenberg, Klein & Lee

(57) ABSTRACT

A pressure tank having a reinforced stainless steel connector that can bear heavy weight and the stainless steel connector makes the pressure tank well water-tightened. The pressure tank mainly contains: an upper chamber, an inner chamber, a sealing washer, a stainless steel connector, a leakproof ring, an elastic diaphragm, a stainless steel ring washer and a lower chamber. The upper chamber has a hole on top thereof. The upper chamber encloses the inner chamber. The inner chamber has an inward protrusion on top thereof. The inward protrusion has a through hole aligned with the hole of the upper chamber and a recession around the through thereof. The sealing washer is installed between the upper chamber and the inner chamber. The sealing washer has a through hole aligned with the through hole of the inner chamber. The stainless steel connector is engaged through the hole of the upper chamber, the through hole of the sealing washer, and the through hole of the inner chamber in order. The leakproof ring is placed around a joint of the inward protrusion and the stainless steel connector and received in the recession of the protrusion. The elastic diaphragm is mounted on an inner side of the inner chamber and defines the upper chamber and a lower chamber. The lower chamber has an inlet for inputting air thereto. Wherein a bottom of the stainless steel connector is riveted to press against the stainless steel ring washer to hold the leakproof ring firmly and secure the inner chamber to the upper chamber.

6 Claims, 5 Drawing Sheets

PRESSURE TANK

CROSS-REFERENCES TO RELATED APPLICATIONS

The present invention is a continuation-in-part application of the U.S. Ser. No. 10/057,962 filed on Jan. 29, 2002, now abandoned which is a Continuation-in-Part of U.S. Ser. No. 09/663,141, filed Sep. 15, 2000, now abandoned.

TECHNICAL FIELD

This invention relates generally to a pressure tank, in particular, to provide a pressure tank having a reinforced stainless steel connector tightly connected thereto.

BACKGROUND OF THE INVENTION

A conventional pressure tank contains a container containing purified water therein, and a connector mounted on a top of the container and connected to a water pipe for input and output of the purified water. The connector includes a hollow threaded head soldered on the top of the container and screwed into a connecting nut of the water pipe, a copper tube having an upper portion secured in the threaded head and a lower portion riveted on an inner side of the top of the container, and a leakproof ring mounted between the inner side of the top of the container and the lower portion of the copper tube.

Pressure tanks can be hanged and connected to a water pipe to prevent water hammer effect. However, the connector bears the weight of the pressure tank and vibration of the tank caused by movements of the water into or out of the tank. Stress is concentrated in the connector portion and may cause damage to the connection. The connector may break or crack and cause water leakage. Besides, when the copper tube is wet, it easily produces verdigris that will do damage to the human body. In addition, the threaded head of the connector cannot be soldered on the top of the container easily and conveniently, thereby causing inconvenience to the operator. Further, the copper tube has a constant wall thickness, so that when the leakproof ring is mounted on the lower portion of the copper tube and the copper tube is riveted to press the leakproof ring during the riveting process, the lower portion of the copper tube is easily deviated due to an uneven pressure distribution, so that the leakproof ring is easily detached from the lower portion of the copper tube during the riveting process, thereby causing a water leakage. Therefore a pressure tank having a reinforced connector with a watertight structure is needed.

SUMMARY OF INVENTION

It is therefore an objective of the present invention to provide a pressure tank having a reinforced stainless steel connector that can bear heavy weight.

Another object of the invention is to provide a pressure tank having a stainless steel connector that is well watertightened.

The present invention, briefly summarized, in one embodiment discloses a pressure tank. The pressure tank mainly contains: an upper chamber, an inner chamber, a sealing washer, a stainless steel connector, a leakproof ring, an elastic diaphragm, a stainless steel ring washer and a lower chamber. The upper chamber has a hole on top thereof. The upper chamber encloses the inner chamber. The inner chamber has an inward protrusion on top thereof. The inward protrusion has a through hole aligned with the hole of the upper chamber and a recession around the through thereof. The sealing washer is installed between the upper chamber and the inner chamber. The sealing washer has a through hole aligned with the through hole of the inner chamber. The stainless steel connector is engaged through the hole of the upper chamber, the through hole of the sealing washer, and the through hole of the inner chamber in order. The leakproof ring is placed around a joint of the inward protrusion and the stainless steel connector and received in the recession of the protrusion. The elastic diaphragm is mounted on an inner side of the inner chamber and defines the upper chamber and a lower chamber. The lower chamber has an inlet for inputting air thereto. Wherein a bottom of the stainless steel connector is riveted to press against the stainless steel ring washer to hold the leakproof ring firmly and secure the inner chamber to the upper chamber.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
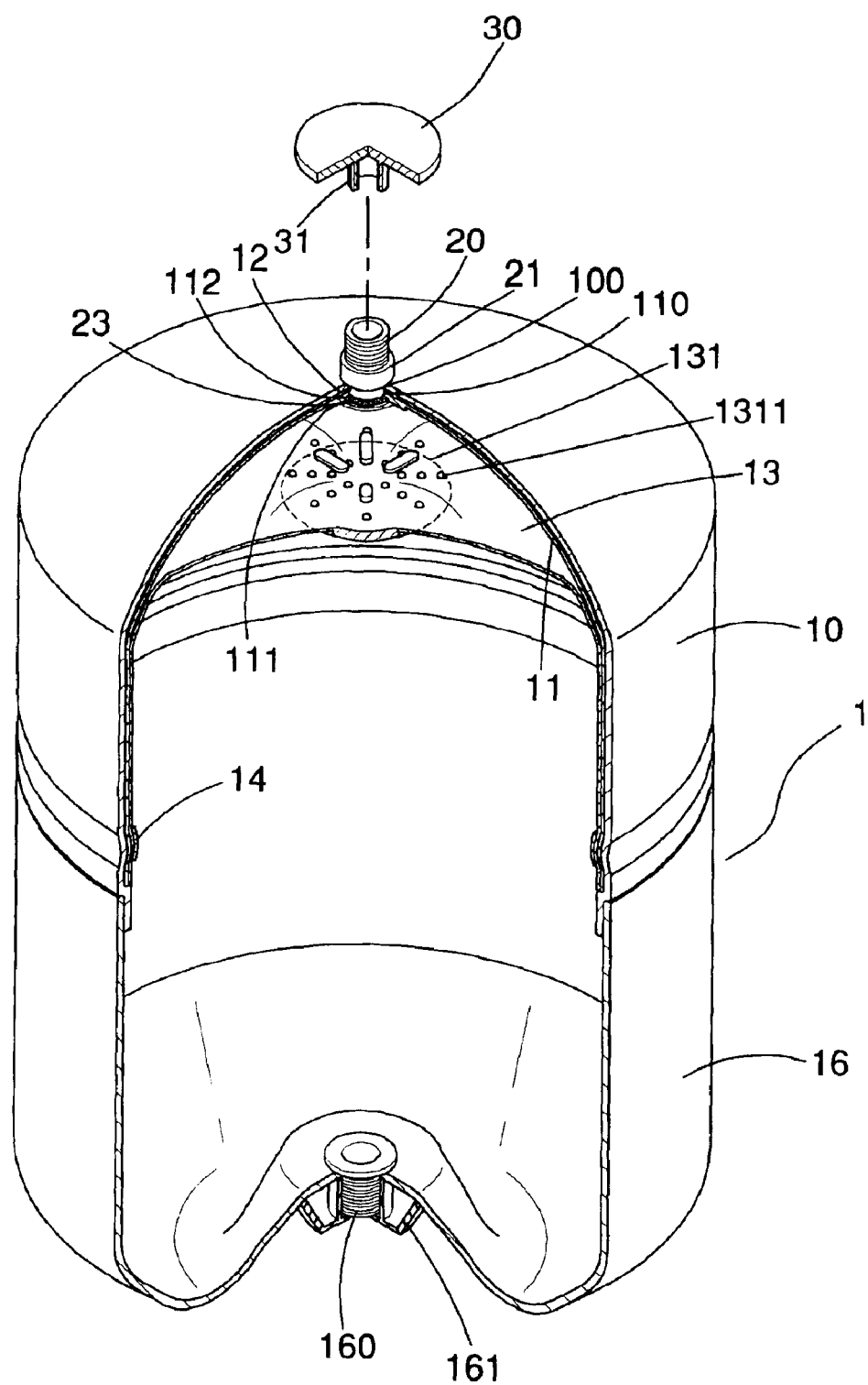
FIG. 1 is a partially cut-away perspective view of a pressure tank in accordance with a preferred embodiment of the present invention.
Figure 2:
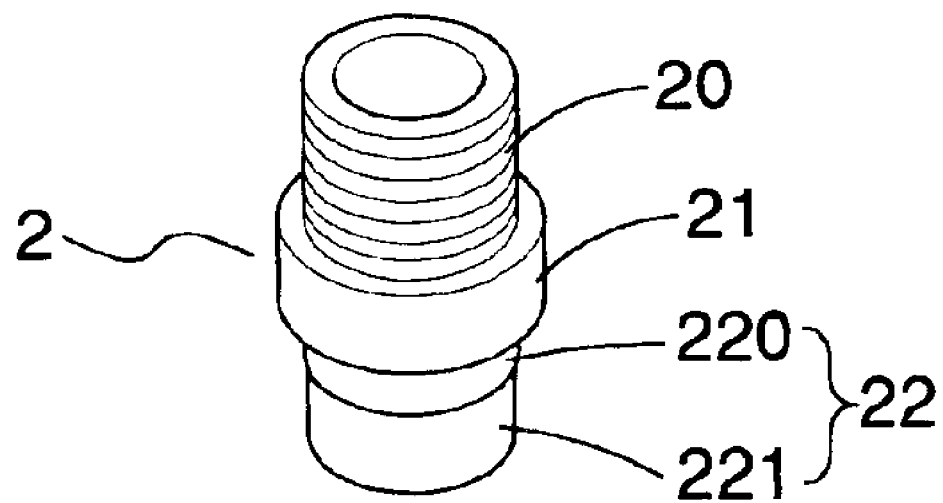
FIG. 2 is a perspective view of a stainless steel connector of the embodiment
Figure 3:
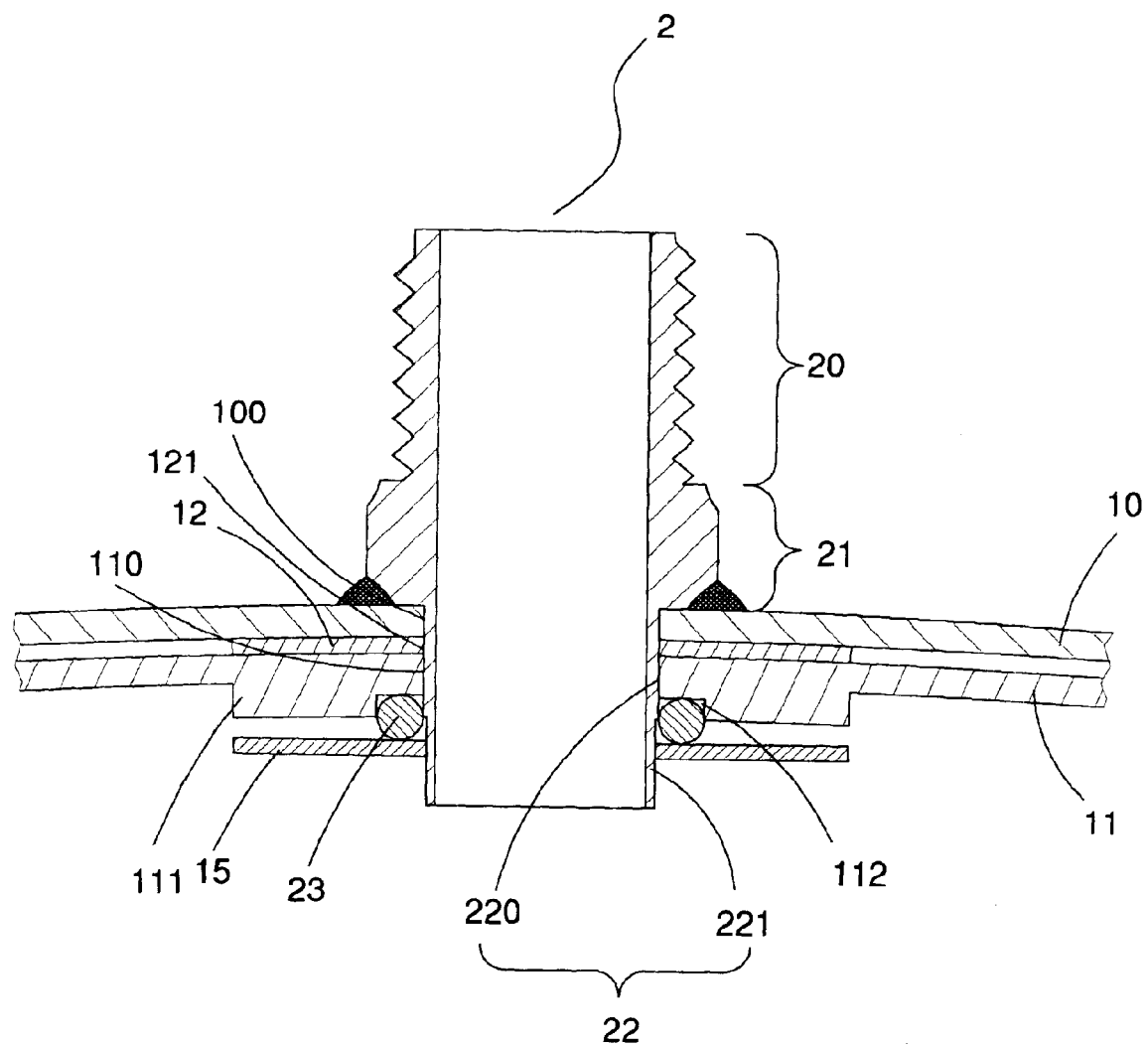
FIG. 3 is a detailed front plan cross-sectional view of the embodiment before the thinner portion of the engaging section being riveted.

With reference to FIG. 1 to FIG. 5, a pressure tank in accordance with an embodiment of the present invention contains: an upper chamber 10, an inner chamber 11, a sealing washer 12, a stainless steel connector 2, a leakproof ring 23, a stainless steel ring washer 15 and an elastic diaphragm 13 and a lower chamber 16. The upper chamber 10 has a hole 100 on top thereof. The upper chamber 10 encloses the inner chamber 11. The inner chamber 11 has an inward protrusion 111 on top thereof. The inward protrusion 111 has a through hole 110 aligned with the hole 100 of the upper chamber 10. The sealing washer 12 is installed between the upper chamber 10 and the inner chamber 11. The sealing washer 12 has a through hole 121 aligned with the through hole 110 of the inner chamber 11. The stainless steel connector 2 includes a threaded section 20, a soldering section 21, and an engaging section 22. The threaded section 20 of the stainless steel connector 2 is connected to a water pipe. The soldering section 21 of the stainless steel connector 2 is mounted on a lower portion of the threaded section 20 of the stainless steel connector 2, and has a cylindrical shape, so that the soldering section 21 of the stainless steel connector 2 may be soldered on the upper chamber 10 rapidly. The engaging section 22 is engaged through the hole 100 of the upper chamber 10, the through hole 121 of the sealing washer 12, and the through hole 110 of the inner chamber 11 in order.

The leakproof ring 23 is placed around a joint of the inward protrusion 111 and the stainless steel connector 2.

Figure 4:
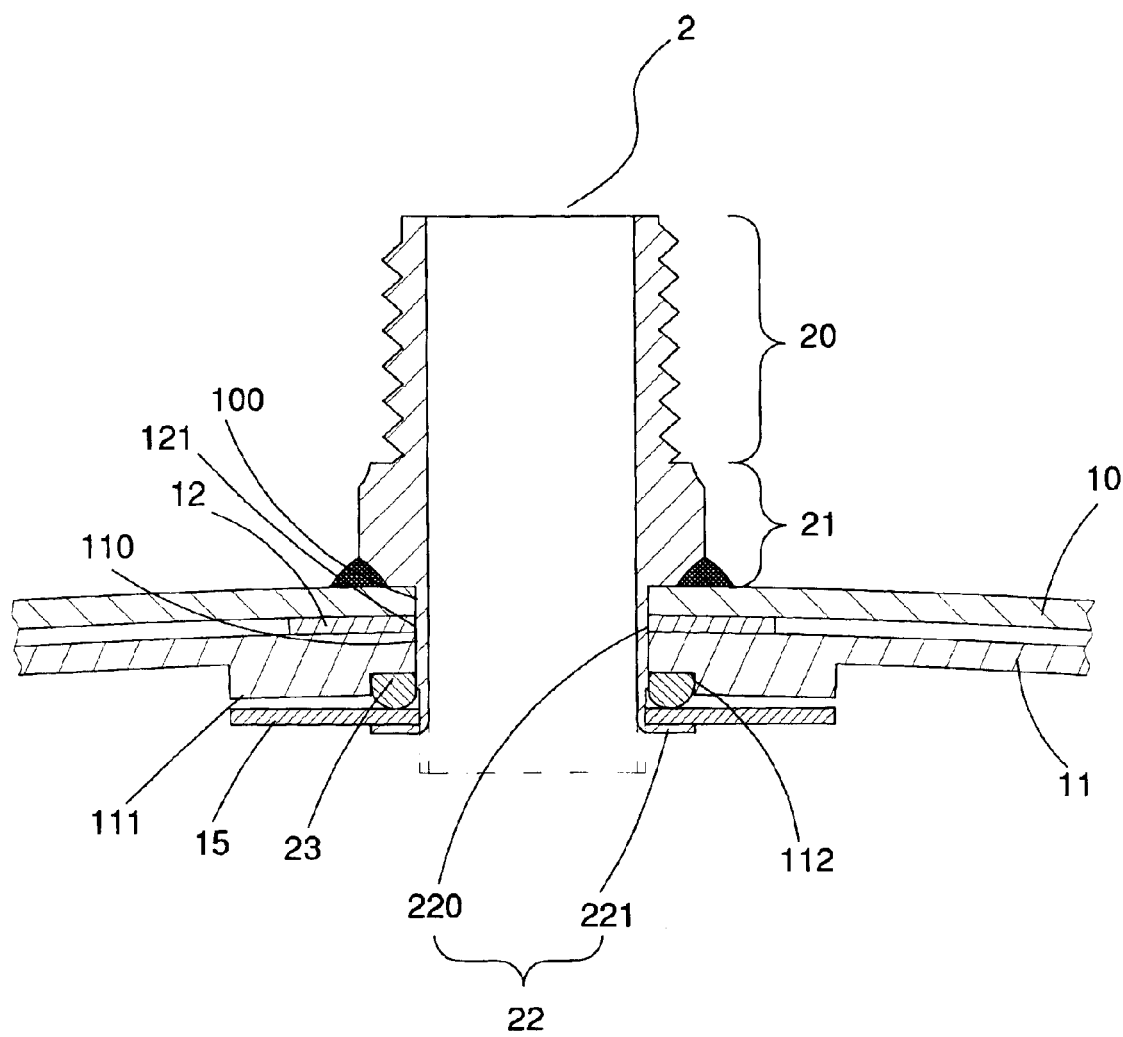
FIG. 4 is a detailed front plan cross-sectional view of the embodiment after the thinner portion of the engaging section being riveted.
Figure 5:
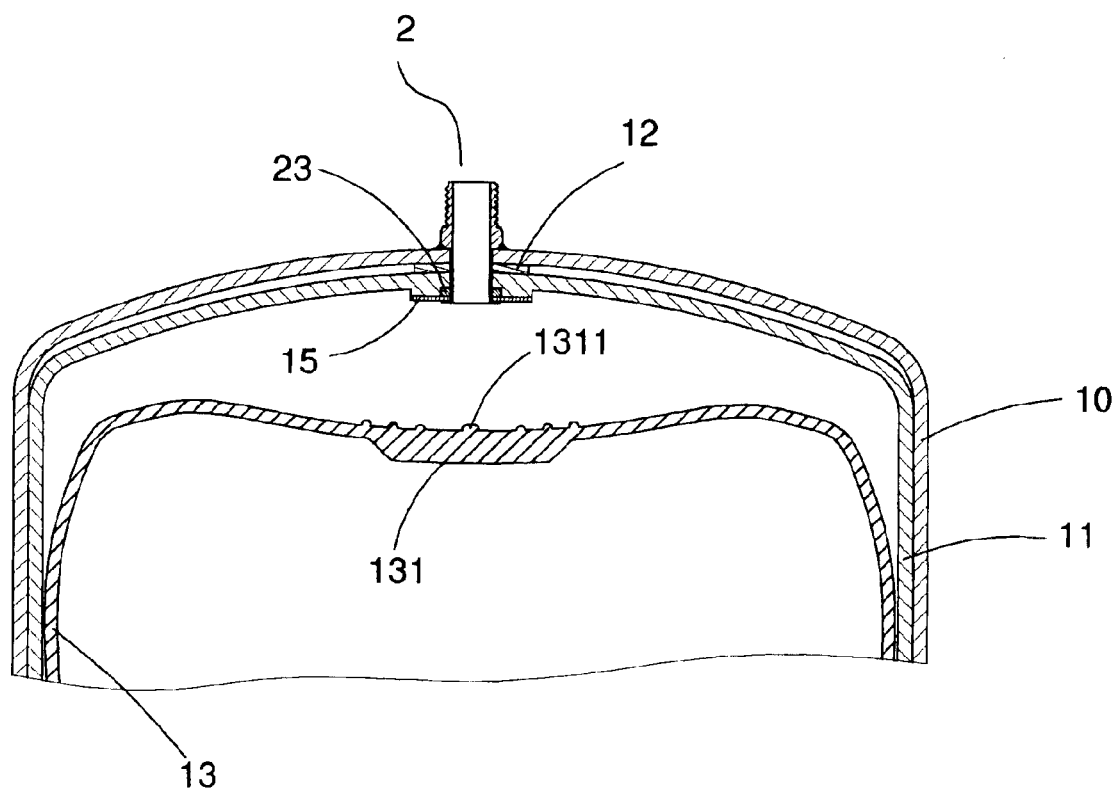
FIG. 5 is a cross-sectional view showing relative positions between the upper chamber, the stainless steel connector, the inner chamber and the elastic diaphragm.

The inward protrusion 111 has a recession 112 around the through hole 110 of the inward protrusion 111 for receiving the leakproof ring 23. The elastic diaphragm 13 is mounted on an inner side of the inner chamber 11 and defines the upper chamber 10 and a lower chamber 16. The lower chamber 16 has an inlet 160 for inputting air thereto and a cover 161 is engaged with an entrance of the inlet 160 for preventing bugs or dusts from entering into the lower chamber 16. The stainless steel ring washer 15 surrounds the stainless steel connector 2 and overlays the leakproof ring 23. The engaging section 22 has a thicker portion 220 and a thinner portion 221. The thinner portion 221 is formed below and connected to the thick portion 220 for being riveted to press the stainless steel ring washer 15 to hold the leakproof ring 23 firmly. Thus, the thicker portion 220 of the press section 22 of the stainless steel connector 2 may function as a support to bear a larger pressure without deformation, and the thinner portion 221 of the press section 22 of the stainless steel connector 2 may be deformed and pressed easily during the rivet press process, so that the leakproof ring 23 may be pressed by the deformed thinner portion 221 of the engaging section 22 of the stainless steel connector 2, and may be secured in the recession 112 of the protrusion 111 of the inner chamber 11 as shown in FIG. 4.

The recession 112 of the protrusion 111 of the inner chamber 11 may provide a positioning effect to the leakproof ring 23, thereby preventing the leakproof ring 23 from detaching from the thinner portion 221 of the engaging section 22 of the stainless steel connector 2 during the riveting process. After the riveting process, the leakproof ring 23 is tightly and closely mounted between the recession 112 of the protrusion 111 of the inner chamber 11 and the thinner portion 221 of the engaging section 22 of the stainless steel connector 2, thereby providing a better leakproof effect.

The soldering section 21 of the stainless steel connector 2 is made with a cylindrical shape, so that the soldering section 21 of the stainless steel connector 2 may be soldered on the upper chamber 10 rapidly by an automatic spot welder, thereby saving the working time and manual work.

A securing ring 14 secures a bottom periphery of the inner chamber 11 to the upper chamber 10. The elastic diaphragm 13 has a reinforced area 131 for resisting a pressure ejected from the inlet 160 of the lower chamber 16. The reinforced area 131 of the elastic diaphragm 13 contains plural reinforcing bumps 1311 thereon. The reinforced area 131 is thicker than other areas thereof. When the pressure tank 1 is not used, a cap 30 is engaged with an entrance of the stainless steel connector 2 for preventing bugs or dusts from entering into the inner chamber 11. The cap 30 has a slot 31 for the entrance of the stainless steel connector 2, so the cap 30 with slot can easily and flexibly engage with an entrance of the stainless steel connector 2. Further, the pressure tank 1 can vertically be placed on a surface by the cap 30. The upper chamber 10 and the lower chamber 16 are made of metal. The inner chamber 11 and the elastic diaphragm 13 are made of plastic to prevent water preserved from being contaminated by rusts on metal surfaces.

In practice, air is ejected into the lower chamber 16 through the inlet 160. Thereby, the pressure in the lower chamber 16 is higher than one atmospheric pressure. A water pipe (not shown) is connected to the stainless steel connector 2. The water pipe has two branches at the opposite side of the stainless steel connector 2. One of the branches is connected to a pump (not shown) and the other branch is connected to a switch (not shown). Purified water is pumped into the inner chamber 11 with a pressure higher than the pressure in the lower chamber 16 through the stainless steel connector 2 and the switch is closed. When the switch is open, the pressure in the inner chamber 11 become equaling to one atmospheric pressure. Thus the pressure in the lower chamber 16 press against the elastic diaphragm 13 to move upward to force the water preserved in the inner chamber 11 running out thereof and then passing through the switch to be provided to consumers.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

I claim:

1. A pressure tank comprising:
   an upper chamber having a hole on top thereof;
   an inner chamber enclosed by said upper chamber said inner chamber having an inward protrusion on top thereof, said inward protrusion having a through hole aligned with said hole of said upper chamber and a recession around said through hole thereof and open communication therewith;
   a sealing washer installed between and in contact with said upper chamber and said inner chamber, said sealing washer having a through hole aligned with said through hole of said inner chamber and said hole of said upper chamber;
   a stainless steel fluid connector engaged through said hole of said upper chamber, said through hole of said sealing washer, and said through hole of said inner chamber in order;
   a leakproof ring placed around a joint of said inward protrusion and said stainless steel fluid connector, said leakproof ring being received in said recession of said inward protrusion;
   a stainless steel ring washer surrounding said stainless steel fluid connector and overlaying said leakproof ring;
   an elastic diaphragm mounted on an inner side of said inner chamber and defining said upper chamber and a lower chamber, said lower chamber having an inlet for inputting air thereto;
   wherein a bottom of said stainless steel fluid connector being riveted to press against said stainless steel ring washer to hold said leakproof ring firmly and secure said inner chamber and said sealing washer to said upper chamber.

2. The pressure tank as claimed in claim 1, wherein said stainless steel fluid connector includes a threaded section, a soldering section, and an engaging section, said threaded section of said stainless steel fluid connector being connected to a water pipe, said soldering section of said stainless steel fluid connector being mounted on a lower portion of the said threaded section of the said stainless steel fluid connector, and has a cylindrical shape and an annular recess formed therein so that said soldering section of said stainless steel fluid connector may be soldered on said tank body rapidly, said engaging section being engaged through said hole of said upper chamber, said through hole of said sealing washer, and said through hole of said inner chamber in order.

3. The pressure tank as claimed in claim 2 wherein said engaging section having a thicker portion and a thinner portion, said thinner portion being formed below and connected to said thicker portion for being riveted to press said stainless steel ring washer to hold said leakproof ring firmly.

4. The pressure tank as claimed in claim 3 further comprising a securing ring for securing a bottom periphery of said inner chamber to said upper chamber.

5. The pressure tank as claimed in claim 4 wherein said elastic diaphragm having a reinforced area for resisting a pressure ejected from said inlet of said lower chamber.

6. The pressure tank as claimed in claim 5 wherein said reinforced area of said elastic diaphragm contains plural reinforcing bumps thereon, said reinforced area being thicker than other areas thereof.

* * * * *